Aug. 30, 1932.  D. H. DAVIS  1,874,918

AUTOMATIC AIR LINE CONNECTION FOR SEMITRAILERS

Filed April 6, 1929  2 Sheets-Sheet 1

Inventor.
Durrel H. Davis.
by his Attorneys.

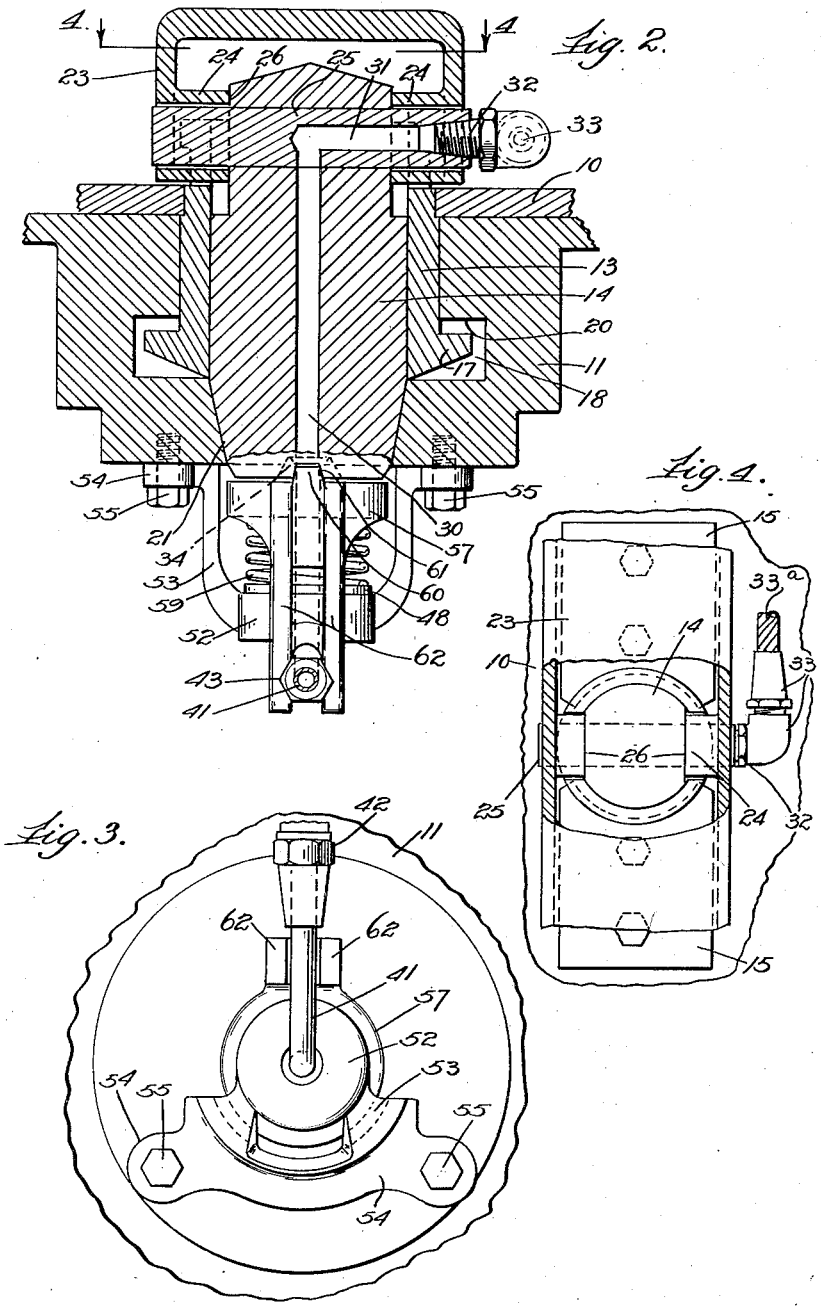

Patented Aug. 30, 1932

1,874,918

UNITED STATES PATENT OFFICE

DURREL H. DAVIS, OF EDGERTON, WISCONSIN, ASSIGNOR TO HIGHWAY TRAILER COMPANY, OF EDGERTON, WISCONSIN, A CORPORATION OF WISCONSIN

AUTOMATIC AIR LINE CONNECTION FOR SEMITRAILERS

Application filed April 6, 1929. Serial No. 352,940.

The purpose of this invention is to provide means for automatically completing or breaking a fluid conduit connection between vehicle units such as a tractor and trailer, effective by the coupling and uncoupling action respectively of said vehicles. It is also a special object of this invention to provide a fluid conduit connection between a tractor and semi-trailer extending co-axially through the swivel connection between the vehicles. It consists in certain features and elements of construction herein shown and described, as indicated by the claims.

In the drawings:—

Figure 2 is a vertical transverse section taken substantially as indicated at line 2—2 on Figure 1, showing the lever bar for controlling the movement of the locking pin.

Figure 3 is a fragmentary bottom view of the device.

Figure 4 is a fragmentary view taken as indicated at line 4—4 on Figure 2.

Figure 1:
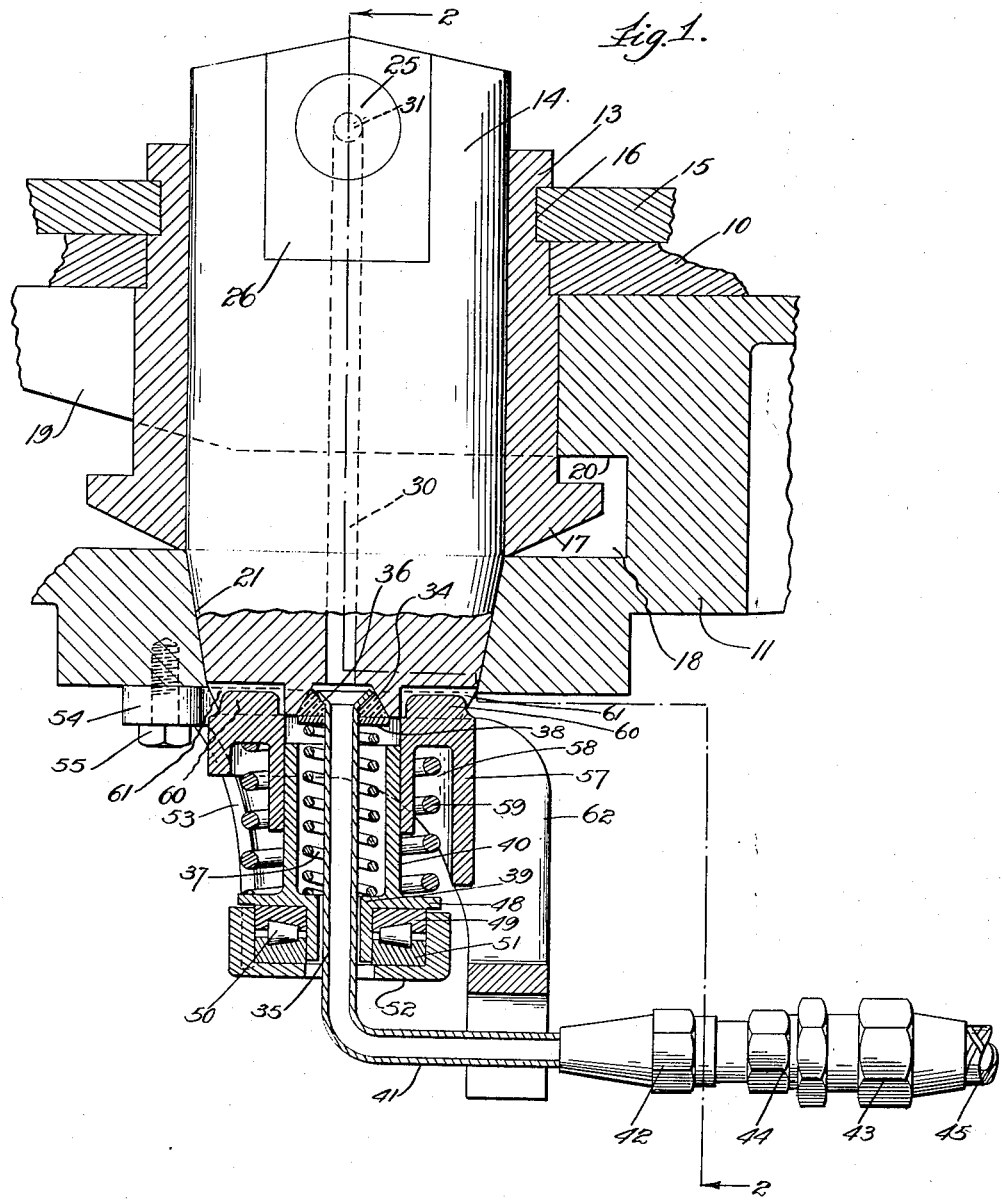
Figure 1 is an enlarged fragmentary vertical sectional view through the swivel connection of a coupled tractor and semi-trailer unit, embodying my invention, with the king pin operating lever omitted.

The present invention is adapted for use in connection with vehicle units consisting of a tractor and semi-trailer swivelly connected together. The swivel connection preferably includes a fifth wheel structure of the separable type in which the upper member is connected to the trailer while the lower member is permanently associated with the tractor vehicle, the upper member having a depending king pin at its center, and the lower member having a rearwardly open radial slot through which the king pin may be moved to the center of the fifth wheel in sliding the parts together for coupling them. A coupling of this type is shown and described in Patent No. 1,785,697, issued December 16, 1930, but for the purpose of clarity this invention is shown in the drawings with only fragmentary portions of the fifth wheel, and as indicated, 10 represents the upper fifth wheel member which is rigidly attached to the trailer, and 11 the lower fifth wheel member carried on the tractor on which it pivots about a transverse, horizontal axis. It is to be understood that in uncoupled position the lower fifth wheel member on the tractor normally assumes a rearward, downwardly tilted position, which tilted position of the lower fifth wheel member facilitates and guides the upper fifth wheel member into proper coupling relation when the vehicles are to be connected together as a unit.

The swivel connection for the fifth wheel members, includes a two-piece king pin, consisting of a sleeve, 13, and a pin, 14, vertically movable in said sleeve and supported by the upper fifth wheel member. The sleeve, 13, depends from the underside of and is rigidly secured to the upper fifth wheel member by a pair of retaining plates, 15, engaging in a groove, 16, formed in the upper end of said sleeve, as shown in the drawings. The lower end of the sleeve is formed with an annular projecting flange, 17, which is adapted to be positioned in a chamber, 18, formed in the lower fifth wheel member, when said members are coupled together. It will be understood that the lower fifth wheel member, 11, is provided with the usual V-groove or slot indicated at 19 leading into the chamber, 18, to permit said sleeve with the pin, 14, to be moved into axial position therein. The upper surface, 20, of the chamber, 18, serves as a stop for the annular flange, 17, to prevent vertical separation of the fifth wheel members; lateral separation of said members being prevented by the lower end of the pin, 14, which extends downwardly into and partially through an opening, 21, formed in the lower fifth wheel member, concentrically of and at the bottom side of the chamber, 18. The extended portion of the pin fits loosely in the lower fifth wheel member to permit relative rotation of said fifth wheel members. The pin, 14, may be moved at will into and out of its bearing opening, 21, under the guidance of sleeve, 13, by any suitable control linkage and levers and as fragmentarily shown in Figures 2 and 4, a lever arm, 23, of inverted U-cross section, is formed with bosses, 24, on the inner sides thereof, providing journal support for a pivot pin, 25, which extends horizontally through the upper end of pin, 14, and is a drive fit therein. The movable pin, 14, is cut back at 26 to provide proper bearing support for the pin, 25, and for assuring compactness of construction. It will be understood that the lever arm, 23, is pivoted for actuation of the pin, 14, and that said lever is moved vertically as more fully described in said Helms Patent No. 1,785,697 on its pivot in an automatic manner, so that when the fifth wheel members are to be uncoupled the pin is raised by said lever, 23, until its lower end is clear of its bearing opening, 21, in the lower fifth wheel member, so that the sleeve, 13, is free to be drawn through V-groove, 19, permitting lateral separation of said fifth wheel members; and when said members are moved to coupling position with the annular flange, 17, pocketed in chamber, 18, the pin, 14, is projected downwardly into locking position in the opening, 21, for securing the fifth wheel members together in coupled relation, as shown in Figure 2.

In vehicle units of the type described, it is desirable for various purposes to interconnect certain fluid actuated mechanism carried by one vehicle to mechanism on the other vehicle, such as, for example, mechanism operating the air brakes on the semi-trailer from a power source on the tractor, and for this purpose I provide a novel construction wherein the connection of the fluid conduits of the vehicles is effected automatically upon the completion of the coupling action of the vehicles. In the construction shown, the movable king pin, 14, is provided with an axial bore or passageway, 30, merging into a transverse axial bore, 31, formed substantially concentrically in the pivot pin, 25, which bore, 31, opens at one end of said pin at which end a nipple, 32, is threaded therein; said nipple being connected to a coupling, 33, of a conductor, 33ª leading rearwardly on the trailer for suitable connection to the operating mechanism. The lower end of the passageway, 30, is counterbored to form a seat for a gasket, 34. The gasket proper may be of any suitable material, such as of rubber, and is mounted on a metal tube or fluid conductor, 35, against its flared end, 36, and is yieldingly urged in an upward direction in contact with the counterbored port mouth of the passageway, 30, by a coiled tension spring, 37, interposed between a washer, 38, engaging the underside of the gasket, and an inwardly extending circular shoulder, 39, of an annular guide sleeve, 40, formed internally of said sleeve, as shown in Figure 1. The tubular conductor, 35, is bent at right angles and its laterally extending leg, 41, is connected by nipples, 42, and 43, and coupling, 44, to a flexible fluid conductor, 45, to form a complete conduit or passageway for the fluid from the conductor, 45, (which may lead from a suitable fluid source on the tractor) to the conductor, 33ª, on the trailer for connection to the brake-actuating mechanism.

The annular guide sleeve, 40, is provided adjacent its lower end with a laterally extending flange, 48, to the underside of which is secured an upper race, 49, for anti-friction rollers, 50, with which cooperate a lower race, 51. The entire anti-friction unit is carried in a cup-shape retainer, 52, which has an integral upwardly extending web, 53, merged into a supporting flange, 54, which is secured to the underside of the lower fifth wheel member by two machine screws, 55. A driving sleeve, 57, is slidably mounted on the sleeve, 40, having an annular chamber, 58, formed therein to seat a coil tension spring, 59, against the upper surface of the flange, 48, which spring yieldingly urges a pair of diametrically opposite driving lugs, 60, formed integrally on the upper surface of sleeve, 57, in mesh with grooves, 61, provided in the lower end of the movable king pin, 14. Said sleeve, 57, is provided with upright, laterally offset ribs, 62, depending below the cup, 52, in yoke formation for straddling the leg, 41, of the tubular conductor, 35.

Thus, since the movable king pin, 14, is arranged to rotate in its sleeve, 13, by the relative swivelling of the trailer to the tractor, the gasket member, 34, is yieldingly maintained in perfect seal with the counterbored port of the bore, 30, during all positions of the tractor and trailer, due to the driving connection between the king pin and the driving sleeve, 57, by means of which the entire tubular conductor, 35, is turned as a unit with said king pin, 14, thus swinging the flexible connector, 45, to either side as the case may be, and insuring a completed conduit, connecting the conductors of both vehicles throughout the whole range of swivelling movement of said vehicles. As may be seen in Figure 3, the supporting flange, 54, and web, 53, for cup, 52, are designed to permit maximum angular movement of the tractor and trailer by providing sufficient clearance for the ribs, 62, of the driving sleeve, 57, when rotated about the swivelling axis. It will be clear that in coupling the fifth wheel members together, the movable king pin, 14, is moved downwardly, causing the gasket, 34, to form a seal around the port of the bore, 30, and engaging the driving lugs, 60, against the reaction of the coil springs, 37 and 59.

If it should happen that the lugs, 60, do not register perfectly with the grooves, 61, when the fifth wheel members are brought together, the sleeve, 57, and its yoke, 62, may be rotated manually through the necessary angle, thus insuring a perfect seal immediately upon completion of the coupling, instead of waiting for the driving lugs to seat in the grooves upon relative rotation of the fifth wheel members.

It is to be understood that broadly my invention consists in providing a fluid conduit connection through the fifth wheel members of a tractor-semi-trailer vehicle unit and is capable of certain variations and modifications without departing from the spirit and scope thereof. I do not therefore wish to be understood as limiting the invention to the specific form shown and described, excepting as indicated by the claims.

I claim:

1. In a vehicle comprising a tractor and a semi-trailer with a fifth wheel for pivotally connecting them together, said connection including a king pin carried by one of the fifth wheel members adapted to be engaged with the other in coupling assembly, a fluid conduit including separate fluid conductors for the tractor and trailer respectively, said king pin being provided with a passageway extending therethrough with one of the conductors permanently connected to one end of said passageway, means co-operating with the other conductor for automatically connecting it detachably with the other end of the king pin passageway in coupling the fifth wheel members, together with means for rotating said cooperating means and a portion of the detachably connected conductor with the king pin during relative pivotal movement of the tractor and trailer to ensure positive connection of the conductor to the king pin passageway at all coupled positions of said tractor and trailer.

2. In a vehicle comprising a tractor and a semi-trailer with a fifth wheel for pivotally connecting them together, said connection including a king pin carried by one of the fifth wheel members adapted to be engaged with the other in coupling assembly, a fluid conduit including separate fluid conductors for the tractor and trailer respectively, said king pin being provided with a passageway extending therethrough with one of the conductors permanently connected to one end of said passageway, means co-operating with the other conductor for automatically connecting it detachably with the other end of the king pin passageway in coupling the fifth wheel members, said co-operating means being provided with a driving member detachably engageable with the king pin for turning said cooperating means with the king pin during the relative pivotal movements of the tractor and trailer.

3. In a vehicle comprising a tractor and a semi-trailer with a fifth wheel for pivotally connecting them together, said connection including a king pin carried by one of the fifth wheel members adapted to be engaged with the other in coupling assembly, a fluid conduit including separate fluid conductors for the tractor and trailer respectively, said king pin being provided with a passageway extending therethrough with one of the conductors permanently connected to one end of said passageway, means co-operating with the other conductor for automatically connecting it detachably with the other end of the king pin passageway in coupling the fifth wheel members, said co-operating means including a detachable driving connection with the king pin and an extension arm engaging the adjacent portion of the detachable conductor for rotating the same with said cooperating means and king pin by the relative pivotal movement of the tractor and trailer.

4. In a vehicle comprising a tractor and a semi-trailer with coupling means including a swivel connection which comprises a socket member carried by one vehicle and a king pin member carried by the other to fit rotatably in said socket, together with means for moving the king pin axially in coupling and uncoupling the vehicles, a fluid conduit comprising a passage extending longitudinally in the king pin and opening through the end thereof which engages in the socket, and a seat carried by the socket member in registration with the socket, and having a passageway disposed to register with that of the king pin when the latter is disposed in coupling position, a support for said seat carried by the socket member and arranged to press the seat yieldingly against the end of the king pin, together with an anti-friction bearing by which said seat is carried rotatably on said support, with means interlocking the seat with the king pin when the parts are thus engaged, and a flexible fluid conduit leading to the seat adapted to permit rotation of said seat with the king pin relatively to the socket member of the coupling.

5. In combination with a fifth wheel for coupling a tractor and a semi-trailer and comprising two members carried by the vehicles respectively, including a king pin associated with one member and a socket for said king pin in the other member, a fluid conduit comprising a passage extending longitudinally in the king pin and opening through the end thereof which engages in the socket, a supporting bracket depending from the fifth wheel member in which the socket is formed, an anti-friction bearing carried by the bracket in substantially axial alignment with the king pin in the socket, a spring resting on said bearing, a conduit of tubing having one end formed with a seat to engage the end of the king pin at its opening, said spring serving to uphold said seat for contact with the king pin, a second spring also resting on said bearing, and a clutch member upheld by said second spring against the end of the king pin, said clutch member and king pin having inter-engaging features for positive connection, and an arm on the clutch member engaging a laterally trending portion of the tubing for swinging the latter with the king pin when said king pin turns in the socket.

6. In the combination defined in claim 5, said clutch member having a depending sleeve portion co-axial with the king pin, and a guide sleeve telescopically engaging said portion with a transverse wall interposed between the anti-friction bearing and the lower ends of the two springs for seating and positioning said springs.

DURREL H. DAVIS.